United States Patent [19]

Yamada

[11] Patent Number: 4,877,015

[45] Date of Patent: * Oct. 31, 1989

[54] MULTIPURPOSE SMOKELESS ROASTER

[75] Inventor: Takeshi Yamada, Nagaya, Japan

[73] Assignee: Shinpo Kabushiki Kaisha, Nagoya, Japan

[ * ] Notice: The portion of the term of this patent subsequent to Jan. 10, 2006 has been disclaimed.

[21] Appl. No.: 191,275

[22] Filed: May 6, 1988

[51] Int. Cl.$^4$ .............................................. F24C 15/20
[52] U.S. Cl. .............................. 126/299 R; 126/41 R; 126/300; 98/115.1
[58] Field of Search ............... 126/299 R, 299 D, 300, 126/21 R, 21 A, 41 R, 301, 214 A, 214 C, 215; 98/115.1, 115.3; 137/599; 138/37; 406/180

[56] References Cited

U.S. PATENT DOCUMENTS

| | | | |
|---|---|---|---|
| 4,165,680 | 8/1979 | Smith et al. | 126/299 R |
| 4,335,705 | 6/1982 | Kiyomitu | 126/299 R |
| 4,582,046 | 4/1986 | Yamada | 126/299 R |
| 4,796,601 | 1/1989 | Yamada | 126/299 R |

Primary Examiner—James C. Young
Attorney, Agent, or Firm—Flynn, Thiel, Boutell & Tanis

[57] ABSTRACT

A multipurpose smokeless roaster comprising: a roasting unit (2), a ceiling (1) having an opened portion (7), a cylindrical outer box (9) having an exhausting unit (3) at the lower end thereof and opened at the upper end thereof, a cylindrical inner box (11) provided inside the outer box (9) and having a burner (23) inside thereof and being opened at the upper end thereof, and a suction passage (X) defined between the outer box (9) and the inner box (11) at a predetermined width for sucking a smoke generated during roasting and cooking. The inner box has an annular surface (15) on which a metal grill or a pot stand (18) are selectively mounted. A movable draft pipe (4) is slidably provided at the exhausting unit (3) of the outer box (9) and a connector box (5) is provided under the movable draft pipe (4) for connecting said movable draft pipe (4) and a duct unit (6) for defining an exhaust gas passage. A static pressure equalizer (34), having a slit (33), is provided inside the connector box (5) for equalizing a suction force applied to the roasting unit (2) with a static pressure.

11 Claims, 4 Drawing Sheets

MULTIPURPOSE SMOKELESS ROASTER

BACKGROUND OF THE INVENTION

1. Field of the Invention

The present invention relates to a multipurpose smokeless roaster, more particularly to a multipurpose smokeless roaster having the function of roasting a meat with the use of the metal grill and cooking a meat, so-called shabu-shabu, with the use of a pot by interchanging the metal grill with a pot stand and also enabling the collection of smoke, generated by roasting a meat and the like, and exhaust gas, to thereafter cool and discharge the collected smoke and the exhaust gas so that a suction force applied to the roaster is equalized with a static pressure.

2. Description of the Prior Art:

In a conventional roaster, a metal grill mounted on an upper portion of a burner of a roaster can not be interchanged with other cooking instruments such as a pot and the like so a conventional roaster is typically installed in a roast meat specialized shop and a roaster to be used in a family setting can not achieve a multipurpose utilization.

There has been known an exhauster for drawing downwardly a roasting smoke and an exhaust gas via the roaster comprising a roasting unit coupled with a duct unit provided therein and a metal grill where the food is placed. With such an arrangement, the roasting smoke is sucked from the roaster downwardly of the exhauster. However, there are such shortcomings that a combustion gas of high temperature produced during roasting and cooking a meat is drawn to some extent downwardly from the exhauster before the food is heated by the combustion gas to thereby reduce remarkably the cooking efficiency as well as effecting incomplete combustion. Furthermore, such an arrangement of the conventional exhauster needs an exhausting pipe made of stainless steel and having asbestos wound therearound discharging the exhaust gas of high temperature so that the exhausting pipe is costly to manufacture. In an exhausting system adapted to employ many roasters with only the use of a single exhausting duct, a damper provided at a connection part between each of the roasters and each of the exhausting ducts is selectively openable to adjust the suction force which is differentiated at a distance between the exhausting duct and the fan thereof. With such an arrangement of the construction, it is difficult to adjust uniformly the suction force generated in all the roasters since the amount of exhaust gas sucked into the exhausting duct is increased or decreased, namely, even if the damper for use in one of the roasters is adjusted, the section force generated in the other remaining roasters are changed. Furthermore, since fresh secondary air is not supplied into an inner box of the exhauster, the amount of oxygen is low in the inner box which results in effecting incomplete combustion at the burner. Still furthermore, since the combustion state of the burner and suction of the roasting smoke are changed, depending on the area occupied by the food placed on the metal grill, and the food is exposed to a dry air accompanied with suction of the smoke in the inner box, the food is dried and deteriorated in the taste inherent to the food.

SUMMARY OF THE INVENTION

It is therefore a first object of the present invention to provide a multipurpose smokeless roaster in which a metal grill and a pot stand can be interchangibly detachably mounted on an annular stage provided circumferentially in an upper opening of an inner box so that the roaster can be utilized for roasting a meat or cooking a meat, so-called shabu-shabu.

It is a second object of the present invention to overcome the shortcomings of the conventional exhauster by providing a multipurpose smokeless roaster enabling the coating and discharging of an exhaust gas generated at the roaster as well as achieving a stable suction force in the roaster.

It is a third object of the present invention to provide a multipurpose smokeless roaster which enables the decreasing of the temperature of the exhaust gas and the adjusting of the suction force of each of the roasters independently, when a plurality of roasters are employed, by introducing secondary air into the exhaust gas without connecting the roasting unit with the duct unit.

To achieve the above objects, the present invention comprises a roasting unit including an outer box, an inner box provided inside the outer box, a gas burner and a suction passage defined between the outer box and the inner box, the outer box and the inner box being respectively cylindrically shaped and fixedly mounted in the roasting unit, the inner box having an annular surface at the upper opened portion thereof, a circular metal grill or a circular pot stand being selectively placed on the annular surface, a movable draft pipe vertically slidably fited in the exhaust unit and provided in a lower part of the outer box, a connector box provided at a lower part of the movable draft pipe, a duct unit insertably connected with the connector box, and a static pressure equalizer for equalizing a suction force with a static pressure provided in the connector box by a slit of substantially triangular shape which gradually widens from the upper portion to the lower portion and is brought into contact with the inside of the connector box in a manner to separate diagonally the exhaust gas passage from the inner passage to the outer passage thereof. The multipurpose smokeless roaster may have a drain pan, an air suction slit and a ventilator provided in the inner and the outer boxes, and a fire screen or plate provided on an opening of a ceiling which is integrated with the outer box.

According to the present invention, a metal grill or a pot stand is selectively placed on the surface of the upper portion of the inner box to be used either as a roaster or a pot for shabu-shabu. Furthermore, the exhaust gas generated from the roaster is cooled and exhausted so that a continuous stable suction effect is achieved.

The above and other objects, features and advantages of the present invention will become more apparent from the following description when taken in conjunction with the accompanying drawings in which preferred embodiments of the present invention are shown by way of illustrative examples

DESCRIPTION OF THE PREFERRED EMBODIMENT

Figure 1:
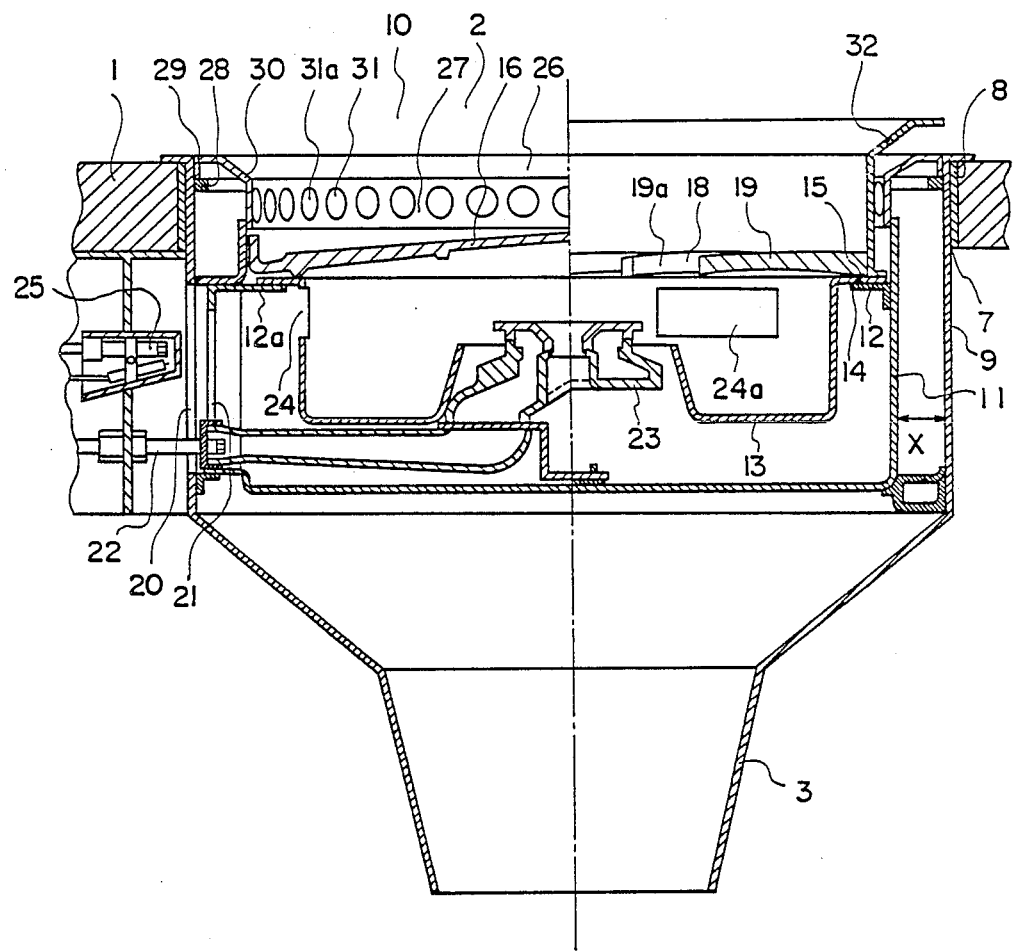
FIG. 1 is a central cross sectional view of a roaster unit of a multipurpose smokeless roaster according to the present invention.
Figure 2:
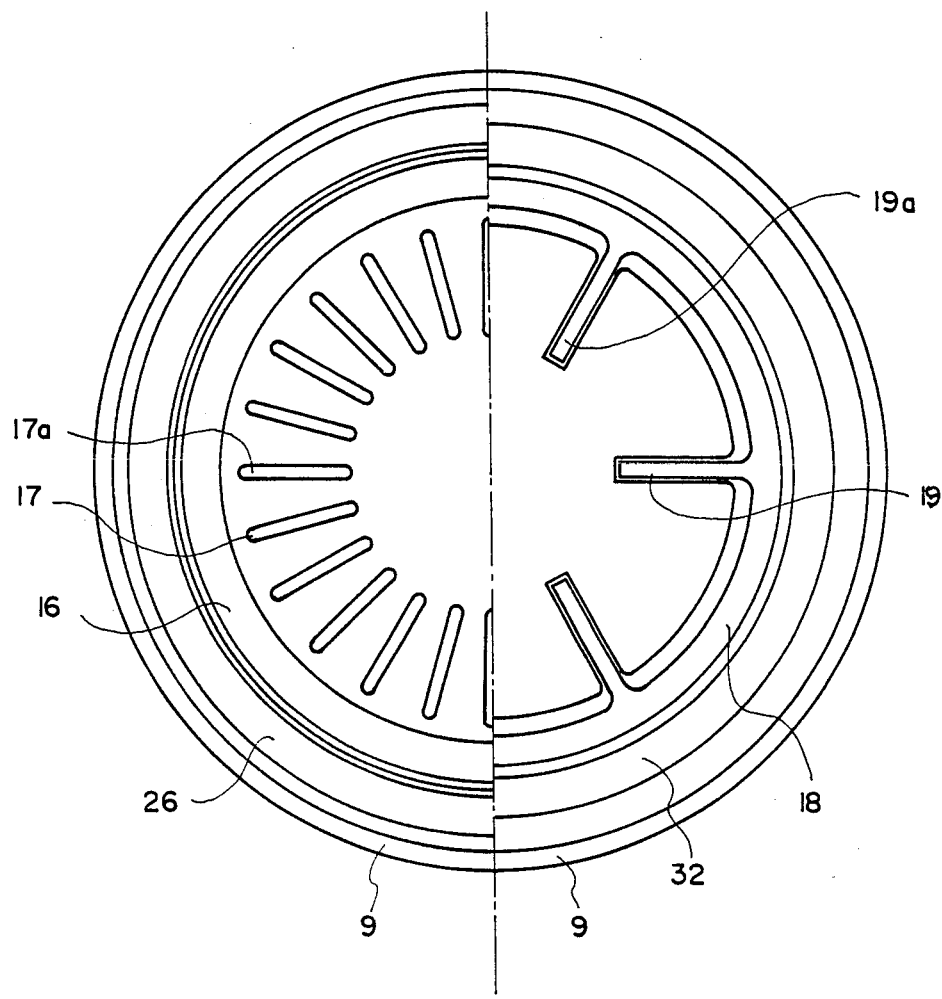
FIG. 2 is a plan view of a multipurpose smokeless roaster of FIG. 1.
Figure 3:
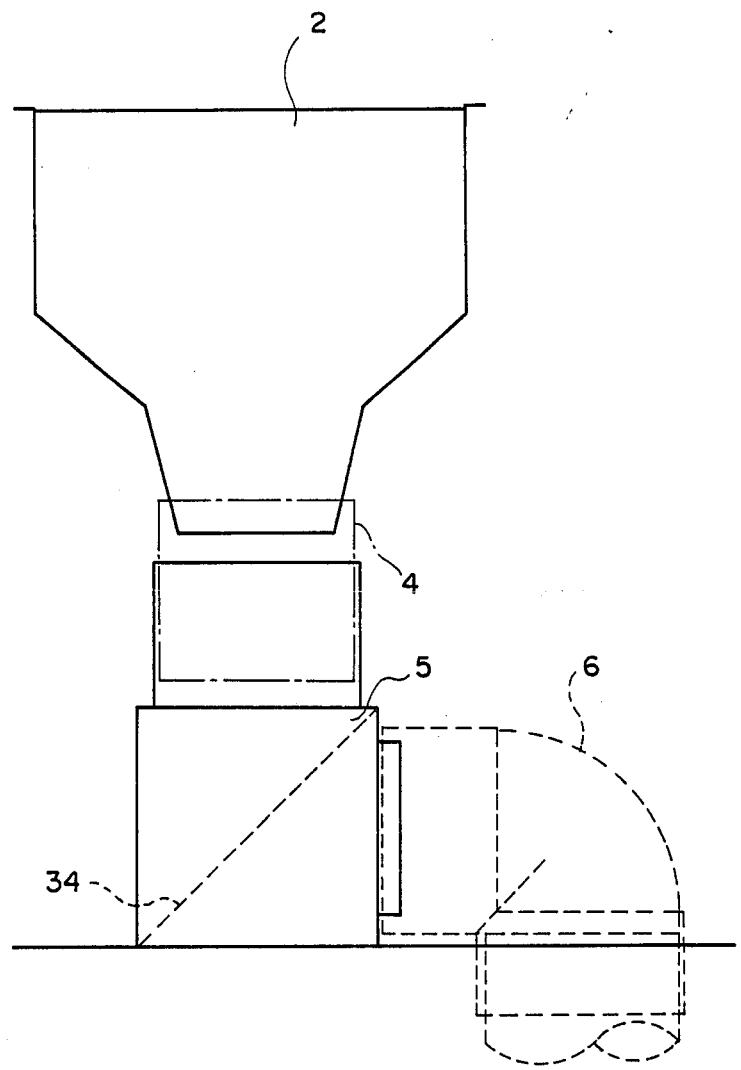
FIG. 3 is a schematic view showing an exhaust mechanism in a multipurpose smokeless roaster according to the present invention.
Figure 4:
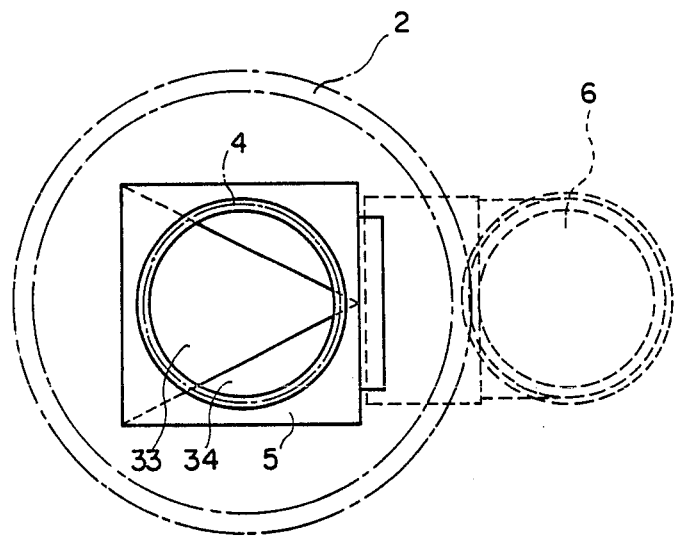
FIG. 4 is a plan view of an exhaust mechanism in the multipurpose smokeless roaster of FIG. 3.

A multipurpose smokeless roaster according to the present invention will now be described with reference to FIGS. 1 to 4.

A multipurpose smokeless roaster comprises a roasting unit 2 fixedly mounted in a ceiling 1, a movable draft pipe 4 connected to an exhausting unit 3 provided at the lower portion of the roasting unit 2, a connector box 5 connected to the movable draft pipe 4, and a duct unit 6 connected to the connector box 5 in such a manner that the exhausting unit 3 and the duct unit 6 have an L-shape about the movable draft pipe 4.

The roasting unit 2 has an outer box 9 fixedly supportedly mounted on an end edge of an opening 7 (the number of the openings 7 is determined by the number of the roasting unit 2 to be mounted thereon) defined by cutting off the ceiling 1 via a fire screen or insulating member 8 made of a fireproof cloth, asbestos, the outer box 9 is opened at the upper portion thereof toward a cooking portion 10 and at the lower portion thereof toward the exhausting unit 3, into which air is sucked by an air suction unit (not shown), and a cylindrical inner box 11 is contained within the outer box 9 and provides a suction passage X having a predetermined spacing between the outer box 9 and the inner box 11. Projection 12, 12a . . . in appropriate numbers are provided at a central portion thereof at the inner peripheral wall surface of an upper opened portion of the inner box 11, and a drain pan 13 for receiving or containing a gravy, a broth and the like is mounted on the projections 12, 12a by a flange 14 provided at an outer peripheral portion of the drain pan 13. An annular surface 15 is defined by the flange 14 and the wall surface of the inner box 11.

A metal grill 16 having a plurality of slits 17, 17a regularly radially arranged or a pot stand having an appropriate numbers of projections 19, 19a . . . extending to the central portion over which a pot for cooking shabu-shabu is placed is selectively mounted on the annular surface 15.

A burner 23 of a gas pipe 22 extends through air ducts 20, 21, which supply fresh air to the outer and inner boxes 9, 11, and is positioned at the central portion of the inner box 11 and extends upwardly through the central portion of the drain pan 13. Suction slits 24, 24a are provided in the upper portion of the drain pan 13 by openings in a portion of the drain pan 13. The suction slits 24, 24a are respectively provided in the same direction as the air ducts 20, 21 and used for lighting by a pilot nozzle 25.

A top grill 26 having an opening 27 is provided opposite to the upper opened portion of the inner box 11 and stably mounted on an annular projection 28 fixed to the upper opened portion of the outer box 9 by a flange 29 defined by bending outwardly the peripheral end thereof. A peripheral wall 30 projects from the opening 27 of the top plate 26 toward the upper circumference of the inner box 11 so as to be brought into contact with the upper circumference thereof so that the opening 27 and the upper circumference are integrated with each other. The peripheral wall 30 is circumferentially perforated to form suction holes 31, 31a . . . in predetermined numbers.

A rectifier plate 32 to be used as a pot stand 18 over which the pot for shabu-shabu is placed has an upper portion bent outwardly and a lower portion extending upwardly from the surface 15 at the outside of the pot stand 18.

The roasting unit 2 is tapered at the lower end thereof to form an exhausting unit 3. The movable draft pipe 4 is vertically and slidably fitted on the outer circumference of the exhausting unit 3, the maximum diameter of which is substantially the same as the outer diameter of the movable draft pipe 4. The width of the gap provided between the diameter of the exhausting unit 3 and the movable draft pipe 4 is adjusted by a vertical sliding operation of the movable draft pipe 4. The connector box 5 is provided at the lower part of the movable draft pipe 4 and the duct unit 6 is connected with the connector box 5 at a side surface thereof. The movable draft pipe 4 and the duct unit 6 are arranged to be in a L-shape arrangement with respect to the connector box 5. The connector box 5 has a space larger than the space necessary to accomodate the exhausting unit 3 and the duct unit 6 and also has a static pressure equalizer 34 comprising a slit 33 of substantially triangular shape which gradually widens from its upper portion to its lower portion and is brought into contact with the inside of the movable draft pipe 4 in a manner so as to separate diagonally the exhaust gas passage from the inner passage to the outer passage thereof.

Operation of the smokeless roaster according to the present invention will be described hereafter.

The metal grill 16 or the pot stand 18 is selectively placed on the surface 15 of the inner box 11 so that the roaster is used both in roasting a meat and for cooking shabu-shabu. When the roaster is used for roasting a meat, the smoke generated from the metal grill 16 is sucked and exhausted radially from the center of the metal grill 16 since the suction passage X is circular and the suction operation is uniformly effected.

When food is placed on the metal grill 16 and roasted by actuating the gas burner 23, the suction force is applied to the outer box 9 via the duct unit 6, the connector box 5 and the movable draft pipe 4. The smoke generated by the roasting is sucked through the openings 31, 31a . . . provided at the upper circumference of the metal plate 20 with the exhaust gas, room air is simultaneously sucked in (described later) due to lamination flow effect so that the exhaust gas is sucked into and discharged from the duct unit 6 via the outer box 9, the exhausting unit 3, and the connector box 5. In the inner box 11, secondary air is supplied from the outside of the roasting unit 2 to the gas burner 16 for combustion via the air ducts 20, 21 . . . to effect complete combustion.

At the time, when the movable draft pipe 4 is lowered to provide a gap between the draft pipe 4 and the exhausing unit 3 while the exhaust gas is passing through the exhausting unit 3, air is introduced from the gap into the flow from the movable draft pipe 4 to the exhausting unit 3 whereby the exhaust gas is cooled and an appropriate suction force is applied to the roasting unit 2.

At the time of the suction of the exhaust gas, the exhaust gas flow is controlled since the width of the slit 33 of the static pressure equalizer 34 is narrow at the inner flow, which has a strong suction force in the connector box 5, while the exhaust gas passes easily through the wider section of the slit 33 which has a weak suction force, so that the exhaust gas from the roasting unit 2 is sucked at the same speed at any point in cross section.

As mentioned above, inasmuch as the smokeless roaster according to the present invention comprises the outer box 9 which is subjected to the suction operation, the inner box 11 has the metal grill 16 such as a steel grill and the gas burner 23, the outer box 9 and the inner box 11 are spaced apart at an interval X defining the suction passage, the exhaust gas generated from the gas burner 23 is not drawn directly in to the duct unit 6 but is entirely applied to the food on the metal grill 16 whereby heat loss is prevented. Furthermore, room air is introduced through the gap to the exhausting unit 3 simultaneously with the suction of the roasting smoke into the outer box 9 to thereby greatly reduce the temperature of the exhaust gas. Accordingly, the exhauster is manufactured at a low cost since the duct unit 6 can be manufactured of a synthetic resin with low cost and easy fabrication.

Furthermore, the roaster according to the present invention is multipurposely used for roasting a meat, or for cooking shabu-shabu only, by selectively placing the metal grill 16 or the pot stand 18 on the surface 15 with such an arrangement that the outer box 9 and the inner box 11 are cylindrically shaped, and the metal grill 16 or the pot stand 18 are respectively selectively and interchangeably placed on the annular surface 15 defined circumferentially at the upper opened portion of the inner box 11.

Still furthermore, inasmuch as the inner box 11, the outer box 9, the surface 15, the metal grill 16, and the pot stand 18 may be defined cylindrical, annular, or circular, no separate burners for the metal grill 16 or the pot stand 18 are required to be installed when roasting the meat or cooking for shabu-shabu and a single burner 23 is enough to uniformly heat the metal grill or the pot stand. A frame hole of the burner 23 is not likely to be clogged by gravy and the like and the shape of the pot stand 18 may be one over which the pot for cooking shabu-shabu is placed which results in manufacturing the pot stand with ease. Inasmuch as the surface 15 is annular, and the metal grill and the pot stand are circular, it is possible to remove the metal grill 16 or the pot stand from the surface 15 since they may be placed on the surface 15 in any direction when they are interchanged with each other.

With the arrangement of the double structure of the cylindrical outer box 9 in which the inner box 11 is provided inside the outer box 9 and spaced apart by the width of the suction passage X from the outer box 9, the smoke generated from the metal grill 16 is sucked uniformly at any portion with high efficiency in the radial direction from the center of the metal plate through the suction holes 31, 31a . . . provided circumferentially in the peripheral wall 30 of the top plate 26 fixedly mounted at the upper periphery of the inner box 11.

Inasmuch as the movable tube 4 is slidably inserted over the exhausting unit 3 provided below the outer box 9 and the connector box 5, connected to the duct unit 6 at the side of the movable tube 4, is provided below the movable tube 4, air is introduced through the gap generated by lowering the moving tube 4 thereby lowering the temperature of the exhaust gas and the suction force to be applied to the roasting unit 2 is regulated with ease without varing the amount of exhaust gas to be sucked into the duct unit 6.

Still furthermore, it is possible to effect a stable discharge operation by adjusting the suction force with the use of the single duct unit 6 provided at one of the roasters at the time of effecting the discharge of the plurality of roasters without changing the suction force generated in the other remaining roasters independently of each other.

Still furthermore since the static pressure equalizer 34 provided in the connector box 5 has a slit 33 which is brought into contact with the connector box 5 in a manner to diagonally separate the exhaust gas passage and widens from the upper portion to the lower portion thereof, the suction force applied to the exhausting unit is uniform at any point in its cross section to stabilize the suction applied to the roasting smoke in the roasting unit 2. Further, since the exhaust gas passage is narrowed by the slit of the static pressure equalizer 34, even if the suction force applied to the duct unit 6 is changed slightly, the thus changed suction force does not directly act on the roasting unit 2 which results in serving as a pressure limiter.

Each of the parts of the roasting unit 2 is removable and disassembled by one touch operation to thereby enable the cleaning of the roasting unit with ease. Furthermore, the smoke or the smell produced by roasting the cooking materials is completely self-contained and no heat is radiated into the room, which results in no raising of the temperature in the room, the meat is wrapped under hot air and roasted by the laminar flow of the air without drying out and deteriorating its succulent taste and tenderness.

Still furthermore, inasmuch as the gas combustion is effected under the complete suction system provided exclusively by the suction duct, a reduction in gas combustion and increase in thermal efficiency is achieved. Inasmuch as the discharge is effected by the use of a duct enabling the gas to be discharged at high speeds at a temperature of 40° C. or below, the discharge duct is optimumly employed as a round duct having low resistance and may be made of vinyl chloride which results in a low manufacturing cost. With the provision of the arrangement of the top plate 26 and the connector box 5, 90% of the grease used in the roasting can be collected inside the roasting unit so that the operator is relieved from the notice of the strain of the oil and the dust and the maintenance of the roaster.

Furthermore, suction slits 24, 24a and the air ducts 20, 21 are provided by penetrating the outer and inner boxes (11, 9), the fresh secondary air is introduced into the inner box 11 to prevent the density of oxygen in the inner box from being diluted or weakened so that the burner is prevented from effecting an incomplete combustion.

Still furthermore, since the outer box 9 is provided at the opening 7 of in the ceiling 1 with an insulating member 8, no heat is conducted to the ceiling 1 from the roasting unit 2 thereby preventing the ceiling 1 from being heated whereby neither a person nor the ceiling 1 is damaged, which results in effective utilization of the roaster.

Although the invention has been described in its preferred form with a certain degree of particularlity, it is to be understood that the present invention is not limited in practical application to the specific embodiment described herein and many changes and variations are possible in the invention without departing from the scope and spirit thereof.

What is claimed is:

1. A multipurpose smokeless roaster comprising:
   (a) an upper support wall extending horizontally and having an opening contained therein;
   (b) a roasting unit comprising a cylindrical outer box having an opened upper end, said outer box being mounted and supported within said opening in said upper support wall by end edges thereon, a cylindrical inner box having an opened upper end contained and supported within said outer box and defining a suction passage therebetween, said inner box having contained therein a burner and an annular surface on which a metal grill or a pot stand may be mounted, said annular surface being defined at an inner peripheral wall surface of said opened upper end of said inner box, and an exhausting unit provided at a lower part of said roasting unit, said exhausting unit being in fluid communication with said suction passage and diminishing in outer and inner diameter as it extends away from said lower part of said roasting unit;
   (c) a movable draft pipe vertically, slidably fitted on the outer circumference of said exhausting unit, said movable draft pipe being capable of introducing outside air into gas exhausted from said roasting unit and regulating a suction force applied to said roasting unit, said movable draft pipe additionally having an inner diameter approximately equal to the maximum outer diameter of said exhausting unit;
   (d) a connector box provided at a lower part of said movable draft pipe and connected therewith at a side surface thereof through a fixed pipe, said connector box containing a static pressure equalizer comprising a slit of triangular shape, said slit gradually widening from a lower portion to an upper portion thereof and separating an inner exhaust passage from an outer exhaust passage, said static pressure equalizer equalizing said suction force applied to said roasting unit with a static pressure; and
   (e) a duct unit provided at the side of said connector box and attached thereto, said duct unit leading to a source of said suction force.

2. The multipurpose smokeless roaster of claim 1, additionally comprising air ducts in fluid communication with said suction passage for introducing fresh air into said inner and outer boxes and a drain pan having a flange provided on an upper outer peripheral surface thereof contained within said inner box, said flange being supportingly mounted on projections provided on an inner peripheral wall surface of said inner box and supporting said drain pan inside said inner box thereby, said burner extending through said air ducts and projecting upwardly through a central opening provided in said drain pan.

3. The multipurpose smokeless roaster of claim 1, wherein an annular top plate is provided within said opened upper end of said outer box, said top plate comprising an upper portion having a support flange provided therearound and a lower portion having a plurality of circumferentially spaced apertures contained therein, said support flange contacting an upper surface of an annular lip provided on an inner surface of said opened upper end of said outer box and supporting said top plate thereby and said top plate lower portion contacting an inner surface of said opened upper end of said inner box so as to form a seal therebetween.

4. The multipurpose smokeless roaster of claim 1, wherein an insulating member is provided between said upper support wall and said outer box.

5. The multipurpose smokeless roaster of claim 1, wherein a metal grill is provided on said annular surface.

6. The multipurpose smokeless roaster of claim 1, wherein a pot stand is provided on said annular surface.

7. The multipurpose smokeless roaster of claim 1, wherein said annular surface comprises said drain pan flange.

8. A multipurpose smokeless roaster comprising:
   (a) an upper support wall extending horizontally and having an opening contained therein;
   (b) a roasting unit comprising a cylindrical outer box having an opened upper end, said outer box being mounted and supported within said opening in said upper support wall by end edges thereon, an insulating member provided between said upper support wall and said outer box, a cylindrical inner box having a opened upper end contained and supported within said outer box and defining a suction passage therebetween, air ducts in fluid communication with said suction passage for introducing fresh air into said inner and outer boxes, said inner box having contained therein a burner, a drain pan having a flange provided on an upper outer peripheral surface thereof, and an annular surface on which a metal grill or a pot stand may be mounted, said flange being supportingly mounted on projections provided on an inner peripheral wall surface of said inner box and supporting said drain pan inside said inner box thereby, said burner extending through said air ducts and projecting upwardly through a central opening provided in said drain pan, and said annular surface being defined at an inner peripheral wall surface of said opened upper end of said inner box, said outer box having an annular top plate provided within its opened upper end, said top plate comprising an upper portion having a support flange provided therearound and a lower portion having a plurality of circumferentially spaced apertures contained therein, said support flange contacting an upper surface of an annular lip provided on an inner surface of said opened upper end of said outer box and supporting said top plate thereby and said top plate lower portion contacting an inner surface of said opened upper end of said inner box so as to form a seal therebetween, and an exhausting unit provided at a lower part of said roasting unit, said exhausting unit being in fluid communication with said suction passage and diminishing in outer and inner diameter as it extends away from said lower part of said roasting unit;
   (c) a movable draft pipe vertically, slidably fitted on the outer circumference of said exhausting unit, said movable draft pipe being capable of introducing outside air into gas exhausted from said roasting unit and regulating a suction force applied to said roasting unit, said movable draft pipe additionally having an inner diameter approximately equal to the maximum outer diameter of said exhausting unit;
   (d) a connector box provided at a lower part of said movable draft pipe and connected therewith at a side surface thereof through a fixed pipe, said connector box containing a static pressure equalizer comprising a slit of triangular shape, said slit gradually widening from a lower portion to an upper portion thereof and separating an inner exhaust passage from an outer exhaust passage, said static pressure equalizer equalizing said suction force applied to said roasting unit with a static pressure; and (e) a duct unit provided at the side of said connector box and attached thereto, said duct unit leading to a source of said suction force.

9. The multipurpose smokeless roaster of claim 8, wherein a metal grill is provided on said annular surface.

10. The multipurpose smokeless roaster of claim 8, wherein a pot stand is provided on said annular surface.

11. The multipurpose smokeless roaster of claim 8, wherein said annular surface comprises said drain pan flange.

* * * * *